United States Patent [19]
Hasegawa

[11] Patent Number: 5,412,792
[45] Date of Patent: May 2, 1995

[54] METHOD AND ARRANGEMENT FOR CONTROLLING MEMORY BANK ACCESS REQUESTS IN DATA PROCESSING SYSTEM

[75] Inventor: Isao Hasegawa, Tokyo, Japan

[73] Assignee: NEC Corporation, Tokyo, Japan

[21] Appl. No.: 46,485

[22] Filed: Apr. 9, 1993

Related U.S. Application Data

[63] Continuation of Ser. No. 456,804, Dec. 26, 1989, abandoned.

[30] Foreign Application Priority Data

Dec. 27, 1988 [JP] Japan .................. 63-328031

[51] Int. Cl.$^6$ .......................................... G06F 12/06
[52] U.S. Cl. ............................ 395/425; 364/DIG. 1
[58] Field of Search ... 364/200 MS File, 900 MS File; 395/400 MS File, 425 MS File

[56] References Cited

U.S. PATENT DOCUMENTS

| | | | |
|---|---|---|---|
| 3,603,935 | 9/1971 | Moore | 364/200 |
| 4,017,840 | 4/1977 | Schild et al. | 395/425 |
| 4,342,079 | 7/1982 | Stewart et al. | 395/425 |
| 4,598,362 | 7/1986 | Kinjo et al. | 364/200 |
| 4,633,434 | 12/1986 | Scheuneman | 395/550 |
| 4,652,993 | 3/1987 | Scheuneman et al. | 395/425 |
| 4,674,032 | 6/1987 | Michaelson | 364/200 |
| 4,680,730 | 7/1987 | Omoda et al. | 395/425 |
| 4,755,938 | 7/1988 | Takahashi et al. | 395/325 |
| 4,835,672 | 5/1989 | Zenk et al. | 395/425 |
| 4,843,543 | 6/1989 | Isobe | 364/200 |
| 4,901,230 | 2/1990 | Chen et al. | 395/425 |
| 4,914,575 | 4/1990 | Kihara | 395/425 |
| 4,928,234 | 5/1990 | Kitamura et al. | 395/425 |

*Primary Examiner*—Reba I. Elmore
*Attorney, Agent, or Firm*—Foley & Lardner

[57] ABSTRACT

A selector is arranged to receive two kinds of memory bank access requests: one is a fresh request and the other a request which has been rejected at least once. In the event that the two kinds of requests are applied to the selector simultaneously, the selector allows the request at least once rejected, in preference to a fresh one, to be checked in the following access decision circuit to see if a bank demanded by the selected request is permissible or not. If the bank access request is not allowed at the access decision circuit, it is delayed for a predetermined time period and is again applied to the selector.

7 Claims, 3 Drawing Sheets

METHOD AND ARRANGEMENT FOR CONTROLLING MEMORY BANK ACCESS REQUESTS IN DATA PROCESSING SYSTEM

This application is a continuation of application Ser. No. 07/456,804, filed Dec. 26, 1989, now abandoned.

BACKGROUND OF THE INVENTION

1. Field of the Invention

This invention relates to a method and a hardware arrangement for controlling memory bank access requests made by arithmetic and/or input/output processors in a data processing system, and more specifically to such a method and an arrangement in which memory banks are accessible regardless of the order of request reception and in which competing access requests for the same memory bank can be settled effectively by way of a simple circuit configuration.

2. Description of the Prior Art

A main memory of a computer may take a form of an arrangement comprising a plurality of banks which are independently accessible by arithmetic and input/output processors. In order to attain the desired high overall operative performance of a computer having such a main memory, it is vital to process bank access requests regardless of the order of reception thereof. This means that accesses which compete for the same bank must be treated effectively.

To this end, memory bank access techniques for controlling competition for the same bank is disclosed in Japanese Patent Application No. 49-142917 filed Dec. 12, 1974 and is laid open Jun. 14, 1976 under the provisional publication No. 51-68735.

This prior art generally comprises: a shift register assembly which includes a plurality of storage units or registers coupled in series; a bank state indicator which provides information indicating whether or not each of memory banks of a main memory is available; a plurality of bank access decision circuits all of which are respectively coupled to the associated storage units of the shift register assembly for receiving the outputs therefrom; and a priority decision circuit which receives all of the outputs of the bank access decision circuits.

According to this prior art, bank access requests are sequentially applied to the shift register assembly and are moved from one register to another under the control of system clocks. Each of the bank access decision circuits, receives the bank state information and the output of the associated storage unit of the shift register assembly. In the event that competition of access requests for the same bank occurs, the priority decision circuit selects one bank access request which is stored in a lower storage unit provided in the lowest position among the storage units containing the competing requests.

The above-mentioned prior art is provided with a number of bank access decision circuits which may simultaneously apply a number of access requests to the priority decision circuit. It follows that the priority decision circuit must select one from a number of requests applied at the same time. Consequently, the prior art is complex in circuit configuration and is especially sophisticated in selecting one access request in preference of the other competing request(s). Further, this prior art is unsuitable for fabrication into an integrated circuit due to its bulky and complicated arrangement.

SUMMARY OF THE INVENTION

It is an object of this invention to provide a method by which competing bank access requests can be effectively treated by way of a simple circuit configuration.

Another object of this invention is to provide a hardware arrangement which effectively controls memory bank access requests by way of a simple circuit configuration.

Still another object of this invention is to provide a bank access request controller for controlling or processing competing bank access requests through the use of a simple circuit configuration.

In order to fulfil the above-mentioned objects, a selector is arranged to receive two kinds of memory bank access requests: one is a fresh request and the other a request which has been rejected at least once. In the event that the two kinds of requests are applied to the selector simultaneously, the selector allows the request at least once rejected, in preference to a fresh one, to be checked in the following access decision circuit to see if a bank demanded by the selected request is permissible or not. If the bank access request is not allowed at the access decision circuit, it is delayed for a predetermined time period and is again applied to the selector.

BRIEF DESCRIPTION OF THE DRAWINGS

The features and advantages of the present invention will become more clearly appreciated from the following description taken in conjunction with the accompanying drawings in which.

DETAILED DESCRIPTION OF THE PREFERRED EMBODIMENTS

An embodiment of the instant invention will be discussed with reference to FIG. 1.

Figure 1:
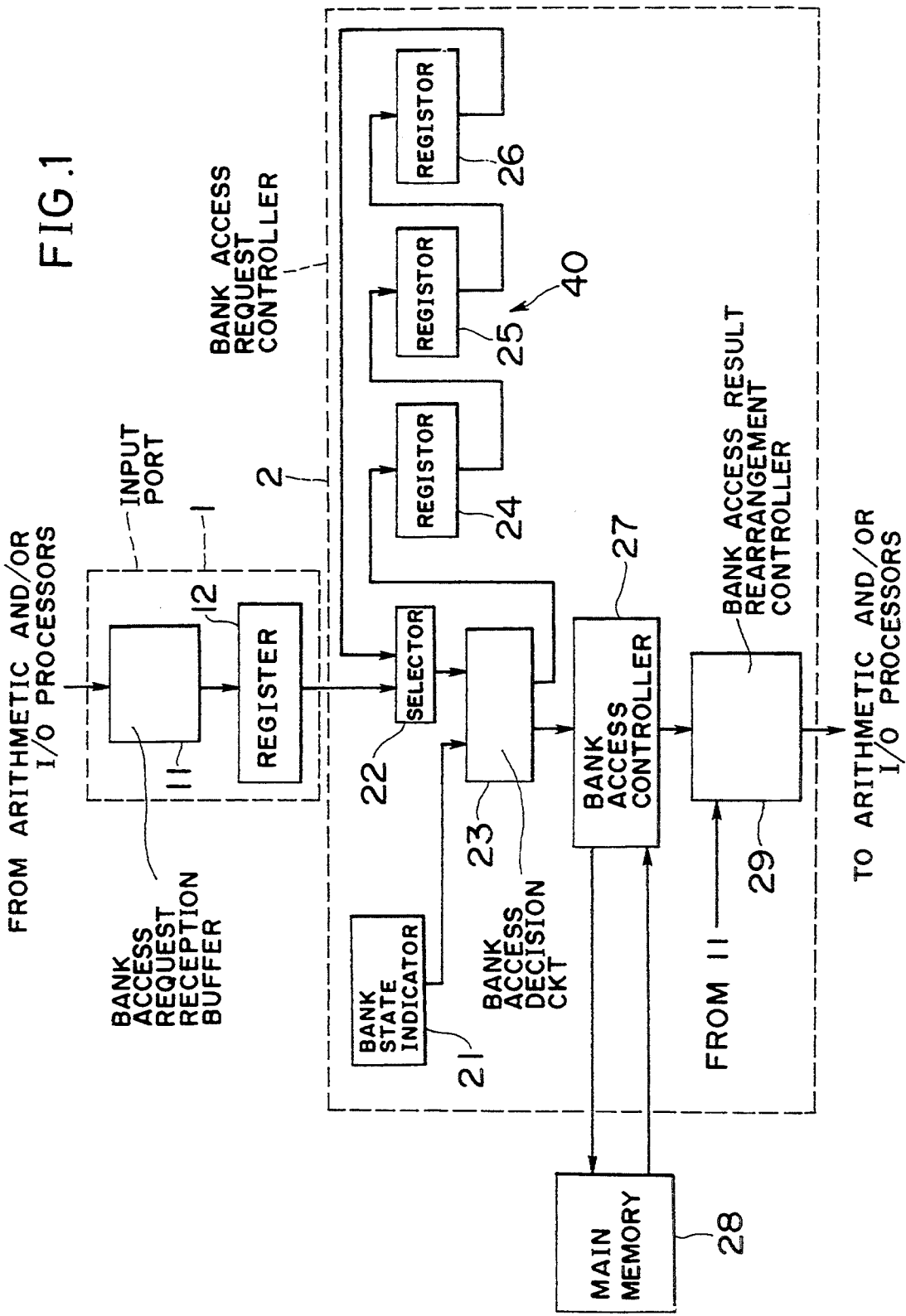
FIG. 1 is a block diagram showing an arrangement according to an embodiment of this invention.

The arrangement shown in FIG. 1 generally comprises an input port 1 and a bank access request controller 2 interconnected therewith. The input port 1 includes a bank access request reception buffer 11 to which memory bank access requests are applied from an arithmetic processor and/or input/output processors (neither shown). The input port 1 further includes a register 12 for storing a memory bank request read out from the buffer 11.

The bank access request controller 2 is coupled to a main memory 28 which comprises a plurality of independently assesible banks (not shown). Timing clocks applied to the blocks of FIG. 1 are not shown for drawing simplicity.

A memory bank access request applied to the buffer 11 includes, address information for access to a specified memory bank, an instruction code for a read or write operation, and data region to which data to be written into or retrieved from a bank is stored, etc.

The request controller 2 comprises, a bank state indicator 21, a selector 22, a bank access decision circuit 23, a shift register assembly 40 which includes in this embodiment three registers 24, 25 and 26 arranged in series, a bank access controller 27, and a bank access result rearrangement controller 29 for rearranging the access results (such as retrieved data in the case of read operation) along with the order of the bank access requests applied to the port 1. It should be noted that the rearrangement controller 29 receives information of the bank access request order from the request reception buffer 11 prior to performing the rearrangement operation.

The bank state indicator 21 includes a plurality of flip-flops respectively assigned to the corresponding memory banks of the main memory 28, and indicates whether or not each of the memory banks is accessible or active. The selector 22 has two inputs coupled to the registers 12, 26, and, when the registers 12, 26 simultaneously output the bank access requests, selects the request from the register 26 in preference to that from the register 12. More specifically, the selector 22 passes a bank request stored in the register 12 to the circuit 23 only when a bank access request is not stored in the register 26.

The bank access decision circuit 23 determines, on the basis of the information from the bank state indicator 21, whether or not a bank access request relayed from the selector 22 is permissible or not. If the request is allowed, the decision circuit 23 applies the allowed request to the bank access controller 27. Otherwise, the decision circuit 23 supplies the register 24 with the access request which was rejected at the decision circuit 23. The bank access request applied to the register 24 is shifted to the following registers 25, 26 in synchronism with clocks, and is again applied to the selector 22.

As shown, the shift register assembly 40 is comprised of three stages (viz., registers 24, 25, 26) in this particular embodiment. However, the number of the registers is determined on the basis of access time of the main memory 28 and the number of memory banks. The bank access controller 27 allows an access request to be implemented. Each result of the memory bank access is applied to the rearrangement controller 29 by way of the bank access controller 27.

While a given bank access request is transferred within the shift register assembly 40, a new request applied to the input port 1 may be allowed to access a memory bank. That is to say, the bank access requests are not necessarily carried out along with the reception order, and hence the results of bank accesses must be rearranged to meet the order of the request reception. To this end, the access result rearrangement controller 29 is provided, which has a table for rearranging the bank access results along with the reception order.

Figure 2:
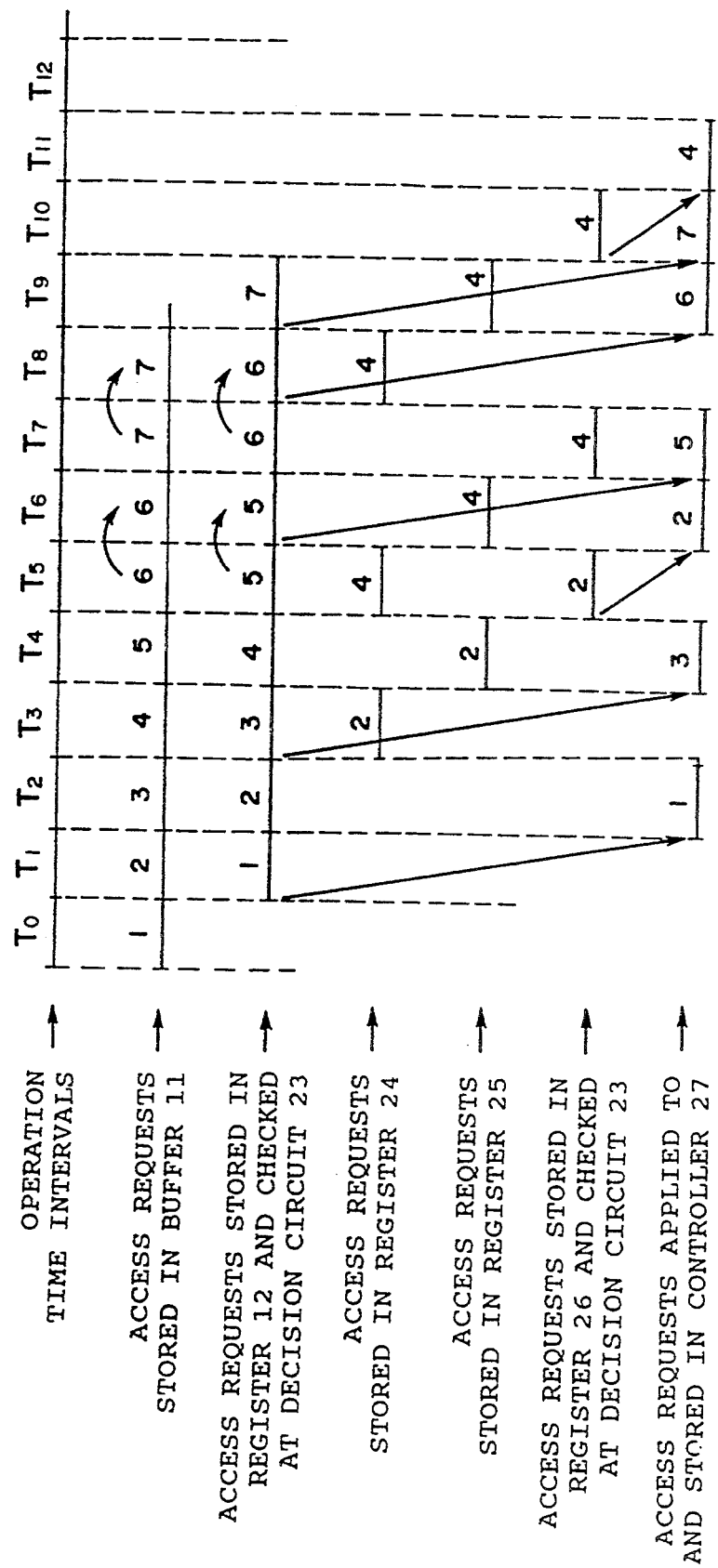
FIG. 2 is a timing chart which shows an example of the manner in which the arrangement shown in FIG. 1, works.

The operation of the blocks 1, 22 through 27 of the FIG. 1 arrangement, which blocks are directly concerned with this invention, will be described with reference to the timing chart shown in FIG. 2, in which (a) each of T0 to T12 denotes an operation time intervals and (b) each of the numerals 1 to 7 a memory bank access request. The first to seventh requests are applied in the numerical order to the input port 1.

The first request which is held in the buffer 11 during operation time interval T0, is transferred to the register 12 during T1. Since there is no bank access request in the register 26 in this case, the first request passes through the selector 22 and the decision circuit 23 checks if the first request is allowed during time interval T1. In this example it is assumed that the first request is allowed at the decision circuit 23 during T1. Accordingly, the first request is applied to the memory bank access controller 27 and stored therein during time interval T2. Thereafter, the first request is allowed to access a bank required.

The second request which is held in the buffer 11 during time interval T1, is transferred to the register 12 during T2. In this example it is assumed that the decision circuit 23 does not allow the second request for use of a demanded memory bank during time interval T2. Therefore, the second request is shifted to the register 24 during T3 and further shifted to the register 25 during T4. At time interval T5, the second request is stored in the register 26 and the decision circuit 23 checks to see if the bank demanded by the second request is available or not. It is assumed in this example that the second request is allowed by the decision circuit 23, and hence it is applied to the bank access controller 27 and stored therein during time interval T6.

The case of the third request is identical to that of the first request, accordingly the third request is applied to the bank access controller 27 and stored therein during time interval T4.

The fourth request which is in the buffer 11 at time interval T3, is transferred to the register 12 during T4. As in the case of the second request it is assumed that the decision circuit 23 prohibits the use of the bank demanded during T4. Therefore, the fourth request is shifted to the register 24 during T5 and is further shifted to the register 25 during T6. At time interval T7, the fourth request is stored in the register 26 and the decision circuit 23 again checks if the bank required by the same is available. In this example it is assumed that during T7 the fourth request is not allowed and is again applied to the register 24 and stored therein during T8. Thereafter, the fourth request is shifted to the register 25 during T9. If the fourth request is finally allowed to access the bank required thereby during T10, it is applied to the bank access controller 27 and stored therein during time interval T11.

The processing of the fifth request will be discussed. The fifth request which is held in the buffer 11 during operation time interval T4 is transferred to the register 12 during T5. In this case, since the second request has priority over the fifth request during T5, the check of the fifth request at the decision circuit 23 is not performed during T5 but carried out during the next time interval T6. Since the fifth request is allowed at the decision circuit 23 during T6, it is applied to the bank access controller 27 and stored therein during time interval T7.

It should be noted that since the fifth request has been checked at the decision circuit 23 during T6 instead T5, the sixth request is transferred to the register 12 during T7. As in the case of the fifth request, since the fourth request has priority over the sixt request, the decision circuit 23 checks the sixth request during T8. In this example it is assumed that the sixth request is allowed at the decision circuit during T8. Therefore, the sixth request is applied to the bank access controller 27 and stored therein during T9.

Lastly, the seventh request is applied to the register 12 during T9. As in the case of the first and third requests, the seventh request is permitted at the decision circuit 23 during T9 and is stored in the bank access controller 27 during T10.

Figure 3:
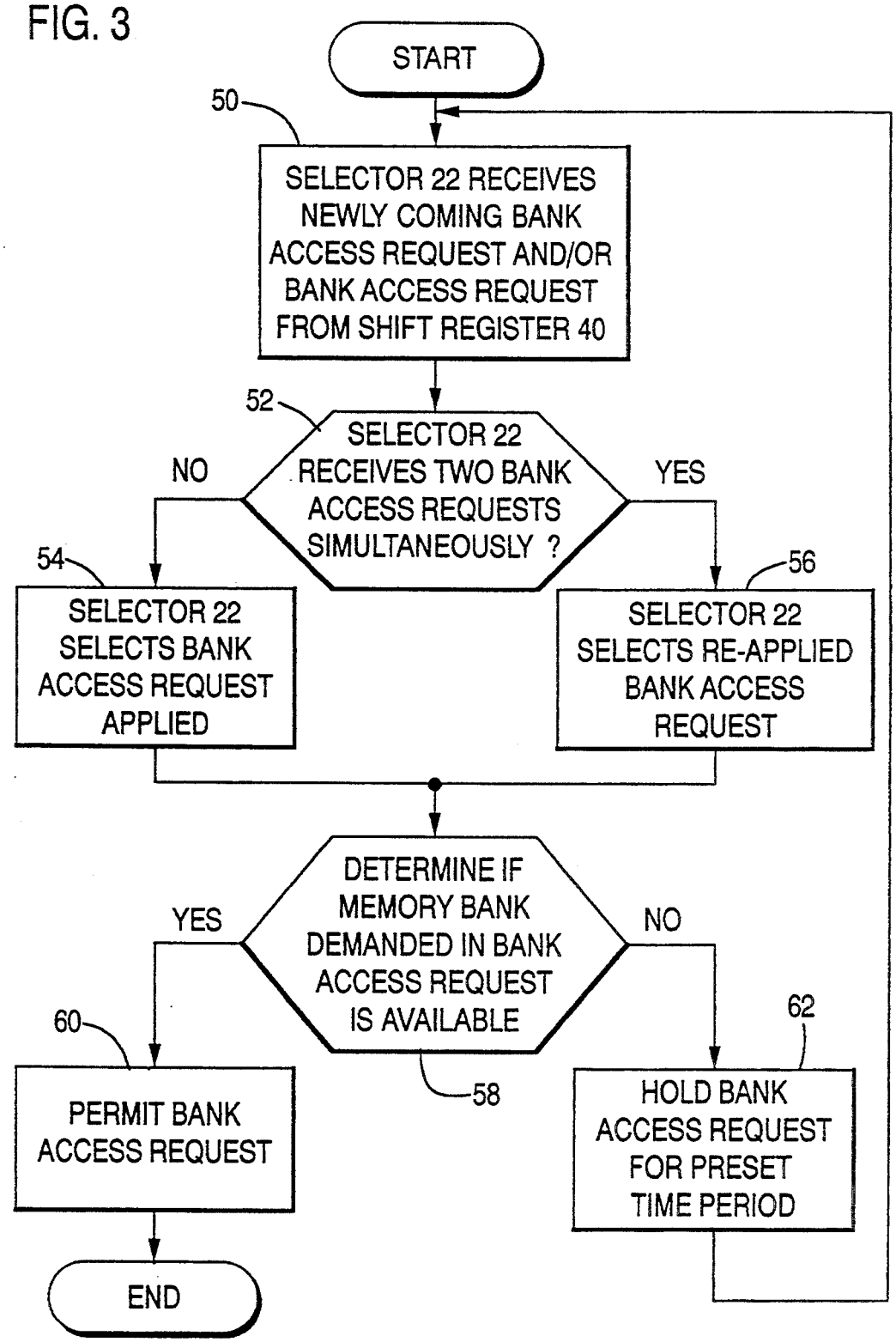
FIG. 3 is a flow chart which characterizes the operations of the present invention.

Reference is made to FIG. 3, wherein a flow chart characterizing the operations of the present invention is shown. In FIG. 3, at step 50, the selector 22 receives a newly coming bank access request from the input port 1 and/or a bank access request from the shift register 40.

In the event that the selector 22 is supplied with one of the two requests, the selector 22 selects the request applied thereto (steps 52, 54). On the other hand, if the selector 22 receives the two requests simultaneously, the selector 22 selects the re-applied bank access request in preference to the newly applied one (steps 52, 56). Subsequently, the bank access decision circuit 23 determines if a memory bank demanded in the bank access request passing through the selector 22 is available (step 58). If the answer is positive, the bank access controller 27 permits the request (step 60). Otherwise, the shift register 40 receives the bank access request rejected by the bank access decision circuit 23 and holds the same for a predetermined time period at step 62, after which the request rejected is re-applied to the selector 22.

As will be understood from the description above, according to the present invention, the competing bank access requests can be processed with a simple circuit configuration.

While the foregoing description describes only one embodiment of the present invention, the various alternatives and modifications possible without departing from the scope of the present invention, which is limited only by the appended claims, will be apparent to those skilled in the art.

What is claimed is:

1. A method of controlling the priority of memory bank access requests received at a request selector via a single bank access request reception buffer, each of said memory bank access requests undergoing an access decision check by an access checking means and transferring said memory bank access requests based on respective said access decision checks, said method comprising the steps of:
   (a) receiving, at said request selector, a first memory bank access request and/or a second memory bank access request, said first memory bank access request being one of a plurality of memory bank access requests newly applied in series to said request selector, and said second memory bank access request being applied via step (g);
   (b) selecting at said request selector, for transfer to said memory bank, one of said first or said second memory bank access requests, whenever said first and second memory bank access requests are not applied simultaneously to said request selector;
   (c) selecting, at said request selector, said second memory bank access request whenever said first and second memory bank access requests are simultaneously applied to said request selector;
   (d) determining whether a memory bank demanded in a specific memory bank access request selected by said request selector is available or not;
   (e) transferring the specific memory bank access request selected by said request selector whenever the demanded memory bank is available;
   (f) holding the specific memory bank access request selected by said request selector in a memory means for a predetermined time period whenever the demanded memory bank is not available; and
   (g) re-applying the specific memory bank access request stored in said memory means to said request selector as said second memory bank access request.

2. A method as claimed in claim 1, wherein step (c) further comprises the step of receiving bank state information indicative of a current state of each of said memory banks, said bank state information being used when performing said access decision check.

3. A hardware arrangement for controlling bank access requests, said hardware arrangement being provided between a main memory of a computer and an input processor, said main memory being constructed of a plurality of banks which are accessible independently, said hardware arrangement comprising:
   first means to which the bank access requests are sequentially applied from said input processor;
   second means receiving at a first input thereof a first bank access request which corresponds to one of the bank access requests applied from said first means and for receiving at a second input thereof a second bank access request which has earlier been refused access to one of said banks and is re-applied to said second means after a predetermined time interval, said second means allowing said second bank access request to pass therethrough in preference to said first bank access request whenever said first and second bank access requests are simultaneously applied to said second means;
   third means for providing bank access state information indicating a current state of each of said banks;
   fourth means coupled to said second and third means, said fourth means receiving one of said first and second bank access requests from said second means and determining if the one of said first and second bank access requests is allowed on the basis of said bank access state information;
   fifth means coupled to receive an allowed bank access request allowed by said fourth means, said fifth means controlling a bank access demanded in the allowed bank access request applied thereto from said fourth means; and
   sixth means coupled to said fourth means and receiving therefrom a specific bank access request which has not been allowed by said fourth means, said sixth means generating the specific bank access request received thereby at a predetermined time delay and applying the same to said second means as said second bank access request via said second input.

4. A hardware arrangement as claimed in claim 3, wherein said sixth means comprises a plurality of registers coupled in series.

5. A hardware arrangement for controlling bank access requests, said hardware arrangement being provided between a main memory of a computer and a processor, said main memory having a plurality of banks which are independently accessible, said hardware arrangement comprising:
   an input port to which the bank access requests are sequentially applied from said processor;
   a bank state indicator which provides bank state information indicating a current state of each of said banks in regard to the storage of additional bank access requests;
   a request controller coupled to both said input port and said bank state indicator, said request controller passing a bank access request applied thereto in a case where the applied bank access request is permissible on the basis of said bank state information, said request controller re-determining, after a predetermined time period, whether a once refused bank access request is permissible, said request controller re-determining said once refused bank access request in preference to a fresh bank access request applied from said input port in a case where said once refused bank access request competes for storage with said fresh bank access request; and a bank access controller coupled to receive a bank access request from said request controller and controlling a bank access demanded by a bank access request applied thereto.

6. A hardware arrangement as claimed in claim 5, wherein said predetermined time period is provided by a plurality of registers coupled in series.

7. A hardware arrangement as claimed in claim 5, further including a rearrangement controller for rearranging the order of bank access requests stored in said main memory.

* * * * *